United States Patent [19]

Paluka

[11] 4,116,052
[45] Sep. 26, 1978

[54] JET ENGINE TEST SET

[75] Inventor: Charles F. Paluka, Northridge, Calif.

[73] Assignee: Semco Instrument, Inc., North Hollywood, Calif.

[21] Appl. No.: 834,277

[22] Filed: Sep. 19, 1977

[51] Int. Cl.² ........................................... G01M 15/00
[52] U.S. Cl. .................................... 73/117.3; 364/431
[58] Field of Search ................ 73/117.3, 116; 364/431

[56] References Cited

U.S. PATENT DOCUMENTS

| 3,300,785 | 1/1967 | Richardson et al. | 73/117.3 UX |
| 3,630,076 | 12/1971 | Staudt | 73/117.3 |

Primary Examiner—Jerry W. Myracle
Attorney, Agent, or Firm—Poms, Smith, Lande & Glenny

[57] ABSTRACT

The present test apparatus is connected to a jet engine to perform a large number of tests of the mode of operation of the jet engine on both a static and dynamic basis. The multifunctional tester includes four sets of numerical displays on the face of the instrument. The first of these displays shows a sequence number and represents the specific test sequence which is being undertaken by the test apparatus at a particular time. An advance switch is provided to advance to the desired test sequence; and the initiate switch which starts the displayed test sequence. Both the advance switch and the initiate switch have indicator lights associated with them indicating that the test apparatus is ready either to have the sequence advanced, or to initiate a test represented by the sequence number. Input switches are also provided on the face of the test instrument for entering the trim RPM for the particular jet engine under test. Inputs to the multifunctional test apparatus include various jet engine temperatures, jet engine rotational speeds, the guide vane angle, and certain fuel limiting amplifier parameters. Predetermined limits for the test results for various static and dynamic tests are stored in the test apparatus, and when the test results do not fall within the limits, the display with the test results which are out of limits, is flashed.

28 Claims, 4 Drawing Figures

JET ENGINE TEST SET

FIELD OF THE INVENTION

This invention relates to test apparatus and more particularly to jet engine testing apparatus.

BACKGROUND OF THE INVENTION

Jet engines are relatively complex and expensive, and the tests required to determine whether a jet engine is in proper operating condition are correspondingly complex and time-consuming. For example, considering the turbofan type of jet engine, it includes a turbofan section at the input to the engine which is followed by a compressor section, after which fuel is injected and both the turbine driver for the compressor and the turbine driver for the turbofan are powered by the burning fuel. As part of the input turbofan section, there are some non-rotating guide vanes which are individually changed in their angular orientation to optimum values for the particular engine speed, aircraft elevation, and the like. The angle of the non-rotating guide vanes is determined by a "RAM" which has a position determined by the pressure at the output from the compressor. To give some idea of the size of turbofan jet engines, the TF-41 turbofan engine weighs about one and one-half tons and is nearly ten feet long. It has a rated thrust of 15,000 pounds which it delivers at approximately 9,150 revolutions per minute.

Included as part of the controls for a jet engine is the fuel limiting amplifier, which is also known as a temperature limiting amplifier. In practice, when output power from the fuel limiting amplifier is increased, fuel flow to the engine is decreased. The fuel limiting amplifier inhibits the jet engine from operating at such high temperatures and/or stress conditions that the engine will be damaged.

Heretofore, the various tests of the jet engine have been made in a relatively primitive manner, using a stop watch and various individual gauges and instruments. Accordingly, the test results depended to a significant degree on the skill of the tester and the attention given to the testing of the engine by the persons conducting the tests.

Accordingly, a principal object of the present invention is to automate and simplify the test procedures for testing a jet engine, and to make the tests relatively simple and foolproof, so that they may be conducted by less highly skilled and less attentive persons.

SUMMARY OF THE INVENTION

In accordance with an important aspect of the present invention, a multifunctional jet engine testing apparatus is provided with several variable displays, and on one of these displays the successive tests which are being conducted by the multifunctional testing apparatus are clearly indicated. In addition, adjacent the sequence display are "advance" and "initiate" switches which have associated indicator lights which are illuminated to indicate that the prior test has been completed and that the system is ready to be advanced to the next test sequence, or, in the case of the initiate indicator lamp, that the sequence has been advanced and that the system is prepared to start or initiate the next test sequence.

In accordance with an additional feature of the invention, the additional variable data displays are provided to give the results of the successive tests. Associated with each of these additional displays are indicator lights to show what data is being displayed at any particular time in the course of the indicated test sequence. Thus, for example, one of the displays has associated with it indicator lights designated "OAT" and "NH". When the indicator lights associated with the "OAT" designation are lit up, this means that the display is showing the outside air temperature; and when the indicator lights adjacent to the "NH" designation are illuminated, the display shows the speed of the jet engine in terms of the percent of standard speed of that section of the jet engine. Similarly, the data displays have associated indicator lights to show the nature of the results or other data which are being displayed during the indicated test sequence.

In accordance with a broad feature of the invention, when the test sequence does not proceed or if test results are not in accordance with a predetermined schedule, with test results within predetermined stored limits, one or more of the four variable displays is flashed to call the departure from routine to the attention of the operator. This may include a failure in the course of the self-test sequence, as well as an output indication which is outside of predetermined scheduled range. The warning signal is preferably given by flashing one of the four variable displays, preferably the display for the test results which fall outside of the predetermined stored limits.

Another feature of the tester is the provision of circuitry for providing simulated signals, representing temperature, speed, or the like of the engine under test, to facilitate static tests of the system.

In operation, the test apparatus is connected to the jet engine under test and to its associated fuel limiting amplifier. Arrangements are provided for setting the trim RPM for the particular engine under test as an input to the test apparatus. Other inputs to the test apparatus include the speed, temperature and pressure of the jet engine, the current supplied by the fuel limiting amplifier and a number of other important jet engine operating parameters.

The test apparatus automatically follows a complete sequence of steps, involving static and dynamic tests, to completely test not only the test apparatus itself but all major operating conditions of the jet engine.

In accordance with another aspect of the invention, the present type of tester could be employed to test engines or prime movers other than the specific types of engine described herein.

Other objects, features, and advantages of the invention will become apparent from a consideration of the following detailed description and from the accompanying drawings.

DETAILED DESCRIPTION OF THE DRAWINGS

Figure 1:
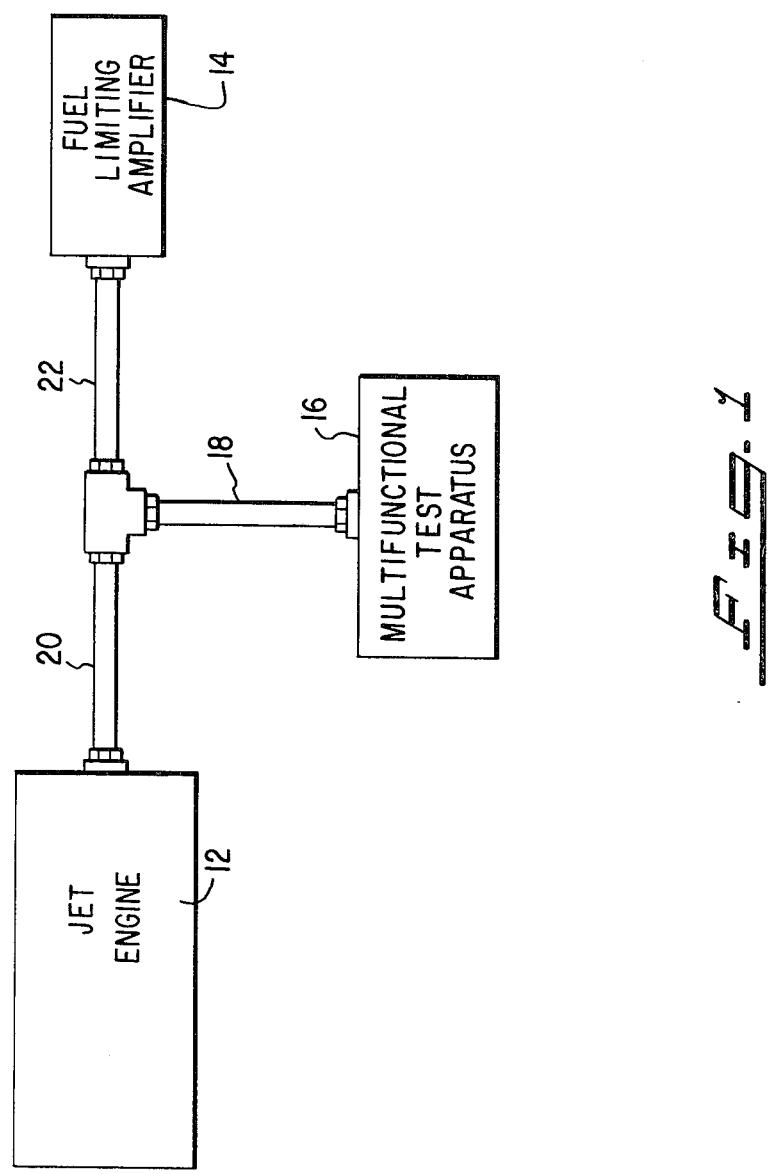
FIG. 1 is a simplified block diagram showing the test apparatus of the present invention connected to a jet engine and to its associated fuel limiting amplifier.

Referring more particularly to the drawings, FIG. 1 shows an engine 12 to be tested, and its associated fuel limiting amplifier 14. The multifunctional test apparatus 16 is interconnected to the engine 12 and the fuel limiting amplifier 14 by the cables 18, 20 and 22.

Figure 2:
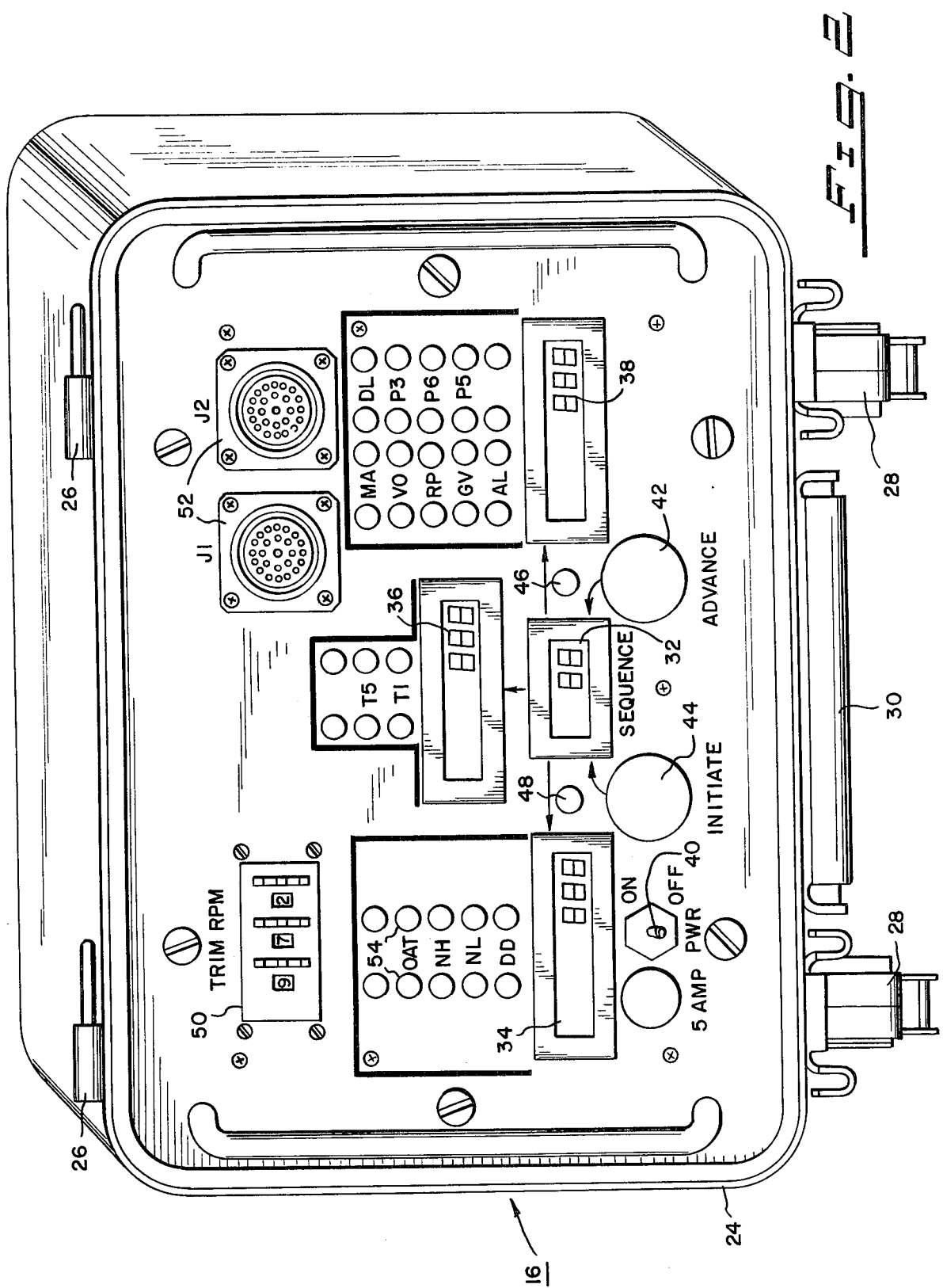
FIG. 2 shows the front panel and the case of a multifunctional test apparatus illustrating the principles of the present invention.

The test set 16 is shown in FIG. 2. It includes the case 24, hinges 26 to which a cover is normally secured, clamps 28 for holding the cover closed, and a carrying handle 30. On the front panel of the test apparatus are four variable displays 34, 36 and 38. Incidentally, particularly in the sequence tables or sequence figures of the drawings, the three data displays may be referred to as data display "0" or "00" (34), data display "1" or "01" (36), and data display "2" or "02" (38). In operation, a two digit identifying number for the particular test which is being undertaken is displayed on the sequence display 32, and the results of the particular test are displayed on the additional three variable displays 34, 36, and 38. The displays 32, 34, 36 and 38 are implemented by arrays of light emitting diodes with display 32 including two digits and the others, each including three digits.

Switches on the front panel of the test apparatus include the on-off switch 40, the advance switch 42, and the sequence initiate pushbutton switch 44. In operation, after the unit is turned on by switch 40, it executes a self-test sequence, with successive steps of the self-test sequence appearing in the sequence display 32. Following completion of the self-test sequence, the light emitting diode, or LED 46 will turn on adjacent the advance pushbotton switch 42. Each time the advance switch 42 is depressed, the sequence displayed in window 32 will step forward, and LED 48 will turn on. At this point, further actuation of the advance button 42 will advance the test sequence appearing in display 32, while depression of the initiate switch button 44 adjacent LED 48 will start the test sequence represented by the number displayed in sequence display 32.

Three rotatable thumb actuated switches are included in the "trim RPM" switch assembly 50 which appears to the upper left in FIG. 2. As mentioned above, the "trim RPM" is the engine speed at which the engine will deliver the rated thrust of the engine. For one particular engine, the Allison TF41 Turbofan engine, the rated thrust is 15,000 pounds, and the nominal RPM at which this thrust will be delivered is 9150 revolutions per minute. In production, the engines will normally deliver 15,000 pounds thrust at a somewhat lesser RPM, normally within five percent of the nominal 9150 RPM. This trim RPM, as it is called, is different for each engine, and for the purposes of the three digit entry in the thumbwheel assembly 50, it is expressed as a percentage of the rated RPM. Thus, for example, if an engine delivered the rated 15,000 pounds thrust at a speed of 88,938 RPM, this RPM figure, or the corresponding 97.2 percentage figure, is the trim RPM of the particular engine. Further, when that particular engine is being tested, the percentage figure of 97.2 is entered into the switch assembly 50. This trim RPM figure is employed in the course of some of the test procedures which are performed by the multifunctional test apparatus 16.

The conductors 52 are employed to interconnect the test apparatus with the jet engine and its associated fuel limiting amplifier as shown in FIG. 1.

Associated with each of the variable data displays 34, 36, and 38 are pairs of LED indicator lights which show what is being displayed on each of the three data displays during specific operational tests sequences. Thus, for example, the two light-emitting diodes 54 associated with the legend "OAT" adjacent display 34, when illuminated, indicate that the Outside Air Temperature is being represented by display 34. Two LED's, such as those designated by the reference numeral 54, are used to assure appropriate indication even if one of the LED's should burn out.

In the following table the significance of each of the designations each of the three displays is set forth.

TABLE 1

DISPLAY 34

OAT — Outside air temperature.
NH — Speed expressed as a percentage of trim speed (power section).
NL — Speed as a percentage of trim speed (compressor section)
DD — Stands for "double datum" and gives time in seconds following the application of a burst of power for take-off.

DISPLAY 36

T5 — Combustion temperature.
T1 — Inlet air temperature (normally slightly below "OAT").

DISPLAY 38

MA — Milliamperes from fuel limiting amplifier to fuel valve.
VO — Voltage across the fuel valve.
RP — RAM position in degrees of angle
GV — Inlet guide vane position in degrees of angle.
AL — Acceleration time — the time to go from idling speed to 1% less than trim RPM as set by the thumbwheels.
DL — The time to shift from full bore speed to 75% of trim RPM.
P3 — Pressure following the compressor turbine at the inlet to the combustion chamber.
PG — Pressure reading in the engine, or the hydromechanical governor pressure.
P5 — The oil pressure in the engine, or the turbine oil pressure.

Figure 3:
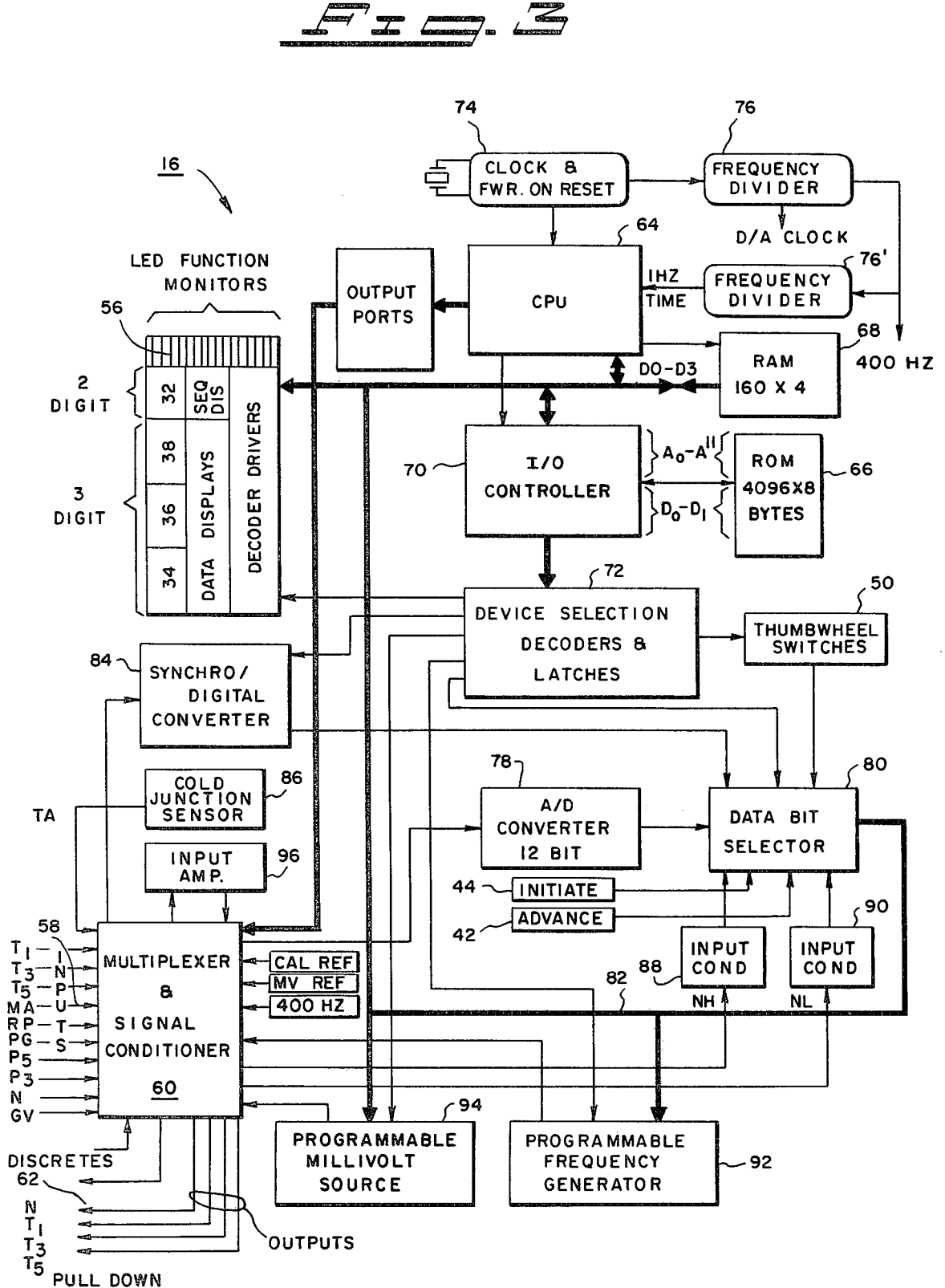
FIG. 3 is a block circuit diagram of the tester of FIG. 2.

FIG. 3 is a block circuit diagram showing the organization of the multifunctional tester of the present invention. In FIG. 3 the sequence display 32 and three data displays 34, 36 and 38 are shown at the left-hand side toward the top of the figure. The associated LED's 56, including, for example, the duplicate LED's 54, as well as the advance LED 46 and the initiate LED 48, are shown immediately adjacent the displays.

The inputs to the tester are indicated at 58 at the input to multiplexer 60, and the outputs from the tester are indicated at 62. These inputs 58 and outputs 62 are included in the cable 18 as shown in FIG. 1.

The tester 16 includes a microprocessor, with a CPU 64 handling the computing and logic processing operations, the sequence control being provided by the read only memory or ROM 66, and the random access memory or RAM 68 providing temporary storage for calculations accomplished by the CPU 64. The input/output controller 70 interfaces with the sequence controlling ROM 66 and the other major components of the system, including specifically the CPU 64 and the block 72 which includes selection decoders and latches. The timing control clock 74 is reduced in frequency by the frequency divider 76, and provides a timing reference permitting real time measurement by the tester, as well as appropriate control of the microprocessor functions. An analog-to-digital converter 78 converts selected analog signals received by multiplexer 60 into digital form so that the digital microprocessor circuitry can handle the information. The data bit selector 80 supplies input information from many sources to the bus 82 so that it may be processed by the CPU 64, routed to the displays 34, 36 and 38, for example, or otherwise processed.

The synchro/digital converter 84 converts input signals which are in synchro form, such as those representing guide vane position, into a digital representation of the input angle. A temperature sensing bridge 86 located within the test unit provides needed input information for self test, for example.

The input conditioning circuits 88 and 90 reduce the level of the incoming signals from the engine representing the speed of the power and compressor sections to levels which may be accommodated by the data bit selector 80.

The programmable frequency generator 92 is employed to simulate the speed of rotation of the engine, and employs a chip which provides a variable frequency output in accordance with an applied DC signal. More specifically block 92 may be implemented by Intersil part No. 8038, and the input voltage is provided by Motorola part No. 1508, which converts the input digital signal to an analog voltage for application to the variable frequency generator.

The programmable millivolt source 94 is employed to simulate temperature for the mass air flow and the double datum tests to be discussed below.

The input amplifier 96 is employed to raise the input level of certain incoming signals such as those derived from thermocouples to levels where they can be handled by the analog-to-digital converter 78.

Incidentally, with regard to the inputs and outputs to and from the multiplexer and signal conditioner 60, they will be enumerated below. First with regard to the inputs 58, they include the intake temperature T1, the interstage temperature T3, the power section temperature T5, the current in milliamperes (MA) from the fuel limiting amplifier to the speed or fuel control valve, the RAM position designated RP, the gas pressure designated PG, the interstage pressure P5, the compressor pressure P3, the engine speed N, and the guide vane angle designated GV. Concerning the outputs, they include the "DD" output which simulates the double datum initiate signal which would normally be generated by a switch actuated upon the release of weight from the landing gear on take-off, the simulated engine speed NL, and the simulated temperatures T1, T5, and "T5 pull-down", which is a special function to be discussed below.

In the following table the sequence of steps executed by the test apparatus will be set forth on a sequential, or step-by-step basis. This will be a generalized statement of the sequence of steps, as contrasted to a specific sequence steps which will be shown below in additional tables or in the drawings, associated with this case.

TABLE II

Step 1 - Turn on.

Step 2 - Initialize data processor.

Step 3 - Scan manual switches, including "Initiate" and "Advance" switches.

Step 4 - Establish and display sequence number.

Step 5 - Perform operations corresponding to sequence number when Initiate switch is depressed.

Step 6 - Illuminate LED lights for functions displayed on any or all of the three data displays.

Step 7 - Display data on any or all of the three data displays.

Step 8 - Is there any problem or are any limits exceeded at any time during sequence of steps? If "Yes", flash one of the four displays.

Step 9 - Prepare to advance or initiate new sequence - light and flash the LED indicator lights at the advance or the initiate switch.

Step 10 - Return to Step 3 and repeat loop for next test Sequence.

In the following portion of the specification the successive tests which are undertaken by test unit 16 will be considered in sequence. It will initially be assumed that the test apparatus is connected to the jet engine under test and to its associated fuel limiting amplifier and that the necessary cable connections are firmly plugged into the connectors 52 on the face of the test unit 16.

The first test sequence is the self test which is designed to insure the proper operation of the multifunctional test apparatus itself, before any attempt is made to use the test apparatus in checking the mode of operation of the jet engine or its associated fuel limiting amplifier.

It may also be noted that a number of the tests are conducted with the jet engine not running. These are known as static tests. In other cases, the tests are conducted with the engine operating, and these tests are designated "dynamic" tests.

The first test sequence which is the self test will now be set forth in Table III.

TABLE III

SELF TEST - STATIC

Step 1 - Turn power on at switch 40.

Step 2 - Set initial conditions in microprocessor; clear input/output multiplexers; set sequence display to "00".

Step 3 - Is NL greater than 0? (is jet engine running?) — if "YES", flash sequence display "00".

Step 4 - Turn on self test enable and lamp test. In this test all of the indicator lights are illuminated.

Step 5 - Initiate blinking of displays. In this test all four displays are blinked with all segments illuminated. This will appear as a set of blinking 8's in all displays.

Step 6 - If both the advance and initiate switches are depressed at turn-on, go to "on-board amplifier test".

Step 7 - If the advance switch is pressed concurrently with turn-on, (a) clear the lamp test, (b) set sequence display to "08", and (c) read MV reference on display "0" or "00" display number 34; read synchro angle on display "1" or display 36, and read the synchro frequency on display "2" or display 38.

Step 8 - If the initiate switch is pressed at turn-on, (a) clear lamp test, (b) set the sequence display to "09", and (c) read thumb wheels on display "2"; TA, or ambient temperature on display "1"; display "0" is set at "00".

Step 9 - Delay for ten seconds, waiting for possible depressing of initiate or advance switches; then proceed; meanwhile, if there is no 10 hertz clock signal, blink the sequence display numbers to show an initial failure.

Step 10 - Clear the lamp test.

Step 11 - Display sequence "81". On display 0, display the output of the calibrate reference circuit (this has a nominal value of 1,000 and should be between 990 and 1010).

Step 12 - Display sequence 82-400 cycle source test. On display 2-390-410 hertz would be displayed in percentage form as 92.8 to 97.7, with 95.7 being equal to 400 hertz.

Step 13 - Display sequence 83 - synchro angle test and display on display "1" (display should be 672 to 696, with 684 representing the desired 60 degrees of synchro angle).

Step 14 - Display sequence 84. Program gain of 100° C. on T1, on display "1".

Step 15 - Display sequence 85. Test program frequency on display "2".

Step 16 - Display sequence 86 - ambient temperature test. Display ambient temperature on display "1" (the temperature should be between −40° C. and +60° C.)

Step 17 - Display sequence 87. Display trim RPM set in thumbwheel switches on display "2".

Step 18 - If any of tests 11 through 17 are not within the proper ranges or are inoperative, no advance is made and lights are flashed.

Step 19 - Light advance lamp and wait for depression of advance switch.

Once the self test sequence as set forth in table III is completed, the operator is assured that the test apparatus is operating satisfactorily, and may proceed to the static and dynamic tests of the jet engine. These individual tests will be considered in connection with FIG. 4 and the remaining tables included in the specification.

Figure 4:
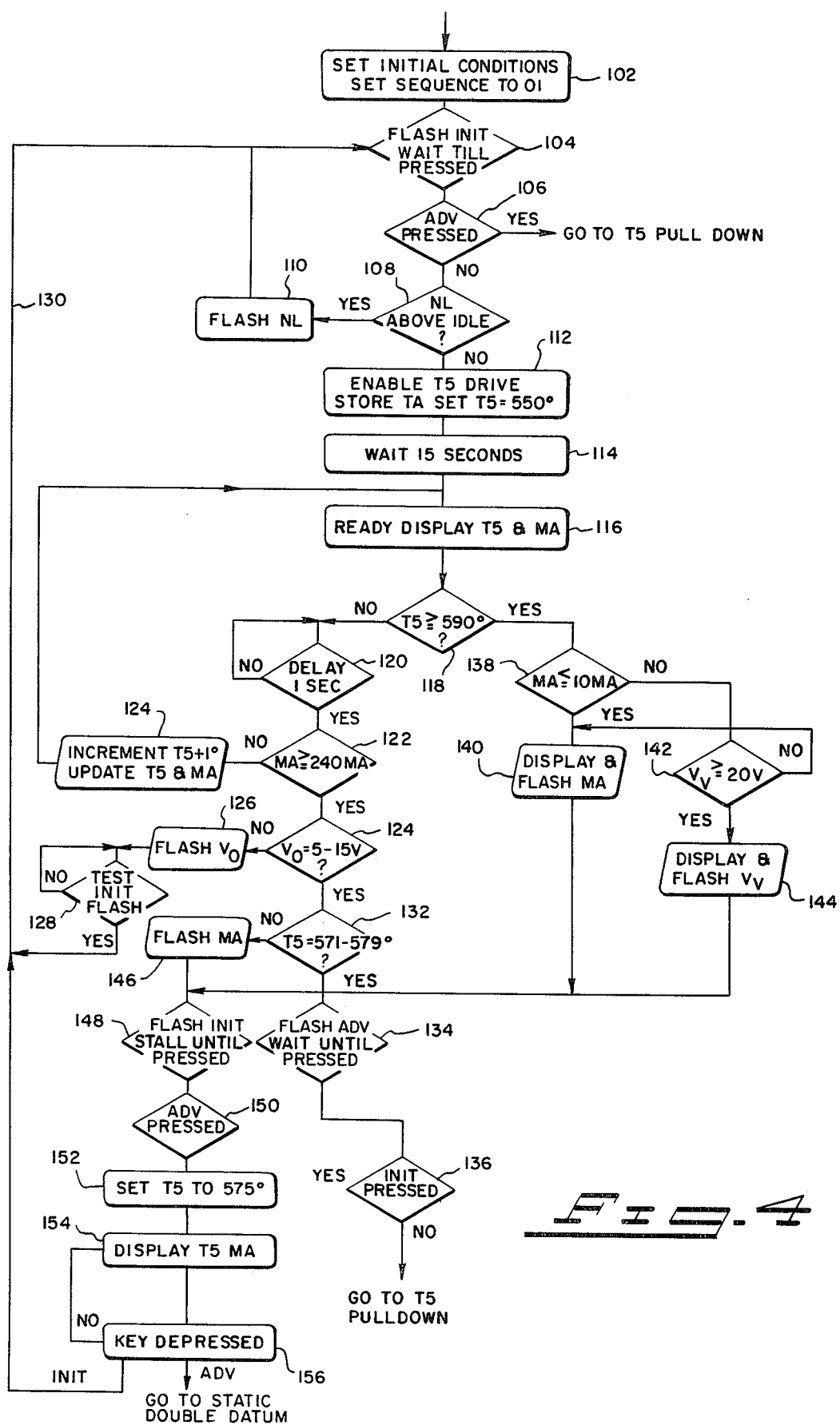
FIG. 4 is a sequence flow chart indicating the successive steps included in the testing of the fuel limiting amplifier, one representative test implemented by the test apparatus of FIGS. 2 and 3.

FIG. 4 is a detailed sequence diagram indicating the steps followed by the multifunctional testing apparatus in the course of testing the fuel limiting amplifier, which as noted above, is also known as the temperature limiting amplifier. In reviewing FIG. 4 a number of steps will be considered which are in essence common to many of the other tests. Accordingly, after detailed review here in connection with FIG. 4, the same or similar considerations may be omitted from future test sequences.

The initial blocks 102 and 104 indicate that the sequence has been advanced to sequence "01" and that the test apparatus is flashing the light emitting diode associated with the initiate switch. However, if the advance switch is pressed as indicated by block 106, the test sequence 01 is bypassed and the test apparatus proceeds to sequence 02 which is the "T5 pulldown test". On the other hand, if the initiate switch is pressed, we proceed to diamond 108 which asks the question, "is the engine speed NL above idle?" Of course, as this is a static test, the engine should not be above idle. Accordingly, if the answer is "Yes", the engine speed NL is flashed in display "0", or "34", as indicated by block 110 in FIG. 4. The test cannot, of course, proceed until the engine is stopped or is at idling speeds.

With the engine speed below idle or the engine stationary, we proceed to sequence step 112 which references the simulation of a temperature T5 equal to 550° C. Incidentally, the fuel limiting amplifier should be operative to deliver approximately 240 milliamperes of current to the fuel limiting valve at a temperature of between 571° and 579°. The present static test is intended to determine whether the fuel limiting amplifier is working correctly to provide this level of current, and also to determine whether the valve may be inoperative as being open circuited or short-circuited, for example.

The next step in the sequence is the delay of 15 seconds indicated by block 114 to permit the development of the desired simulated temperature. Block 116 indicates that the simulated temperature T5 is displayed in display 1 and that the output milliamperes of fuel limiting amplifier current are displayed in data display 2. A local loop for incrementing the simulated T5 temperature includes the block 118, block 120 indicating a delay of 1 second, a diamond 122 indicating a determination as to whether the current is above 240 milliamperes or not, and the block 124 which indicates incrementing the simulated T5 temperature by an additional degree. Accordingly, the temperature starts at 550° and is stepped up through the local loop described above until either the current from the fuel limiting amplifier exceeds 240 milliamperes, or the temperature is incremented to 590° or above.

Once a fuel limiting amplifier output of more than 240 milliamperes is obtained, and displayed on display 2 or display 38, the voltage across the fuel limiting valve is checked, as indicated by diamond 124 to determine if it is in the desired range of from 5 to 15 volts. If not, the actual voltage across the valve is flashed in display 2, as indicated by block 126. The test initiate light emitting diode 48 is also flashed, as indicated by diamond 128. If desired, the initiate button may be depressed which will carry the cycle through loop 130 back to the start of the cycle at the output of block 104.

If the voltage across the valve VO is between 5 and 15 volts, the sequence advances to diamond 132 which checks to determine if the temperature T5 is between 571° C. and 579° C. A "yes" answer to this check indicates that the fuel limiting amplifier has checked out successfully and the advance LED 46 associated with advance button 42 is flashed, as indicated by diamond 134. If the advance switch is then depressed, the sequence advances to sequence "02" which is known as the "T5 Pull Down" test. This test is initiated as indicated by diamond 136.

Now, returning to some of the branches indicating adverse results encountered in the test, let us consider a "yes" answer to the question of diamond 118, which is: "Is a simulated T5 temperature equal to or greater than 590°?" A "yes" answer from diamond 18 indicating that the temperature is over 590°, and that the output from the fuel limiting amplifier has not exceeded 240 milliamperes, leads to diamond 138 which checks to determine whether the output from the fuel limiting amplifier is greater than 10 milliamperes. A "yes" answer to this question causes the display of the actual milliamperes in display No. 2 as indicated by block 140 in the sequence chart, and the defective fuel limiting amplifier may be analyzed based on this reading. A "no" answer to the question of whether the current is greater than 10 milliamperes takes the sequence to diamond 142 which indicates a check to determine whether the voltage on the fuel limiting valve is equal to or greater than 20 volts. A "yes" answer to this question brings the sequence to block 144 indicating that the valve voltage will be displayed and flashed. Of course, if a voltage is present across the valve and no current is flowing, this would indicate that the solenoid valve is defective and probably has an open circuit in its coil. If the voltage across the fuel limiting valve is not greater than 20 volts, the sequence loops over to block 140, to display and flash the output from the fuel limiting amplifier in milliamperes.

Now, returning to diamond 132, the question is asked whether T5 is between 571° and 579°, which is the proper range for the current from the fuel limiting amplifier to exceed 240 milliamperes. A negative answer means that the fuel limiting amplifier is not operating properly, perhaps providing insufficient current for a particular temperature level, and sequence step 146 indicates that the milliamperes of output from the fuel limiting amplifier will be flashed. Diamond 148 indicates that the initiate LED is also flashed. If the advance key is pressed as indicated by diamond 150, the simulated temperature T5 is set to 575°, as indicated by sequence step 152, and the output current from the fuel limiting amplifier in milliamperes is displayed, as indicated by block 154. This display continues until either the initiate or the advance key is depressed, as indicated by sequence step 156. Depressing the advance switch from this sequence step causes an advance to the static double datum test, to be discussed below. On the other hand, depressing the initiate pushbutton causes the test shown in FIG. 4 to be repeated.

The next sequential test which will be considered is designated the "T5 pull down" test, and has a sequence display number of 02. The T5 pull down test relates to a temperature "pull down" switch in the cockpit which the pilot may employ in the course of testing the jet engine to determine whether the fuel limiting amplifier is operating without going to the relatively high temperature at which the fuel limiting amplifier actually comes into play. This relates to the fact that a jet engine has a limited life when running at maximum rated temperature, and there is no need to operate at fully rated temperature if much the same result may be achieved at lower temperatures. As noted in the previous test sequence, the fuel limiting amplifier should deliver in the order of 240 milliamperes of output current at a temperature of between 571° and 579°. When the pilot operates the temperature pull down switch in the cockpit, however, the fuel limiting amplifier is shifted in its operating level by 100°, so that it will deliver the 240 milliamperes of current at between 471° and 479° rather than between 571° and 579°.

In the following test sequence 02, the test apparatus simulates a closing of the T5 pull down switch, and checks the fuel limiting amplifier out at the lower temperature range. The test is a static test and the engine must therefore not be operated above the idling speed. The successive steps of the T5 pull down test will be set forth in Table No. IV.

TABLE IV

T5 PULL DOWN TEST - STATIC TEST

Step 1 - Set sequence to display 02.
Step 2 - Flash initiate until depressed; meanwhile flashing the engine speed NL in display 34.
Step 3 - If advance switch is depressed, proceed to acceleration test.
Step 4 - Check to determine if engine speed is above idle and block further progress of test until engine speed is below idle; meanwhile flashing engine speed NL.
Step 5 - Set simulated T5 temperature to 450° and close the T5 pull down switch; meanwhile continuously displaying both T5 and MA.
Step 6 - Delay for one second.
Step 7 - Check to see if T5 is greater than 500° and if so, flash the MA indication to display the current output of the fuel limiting amplifier.
Step 8 - Check to determine if MA is greater than 240 milliamperes and if not, increment T5 by 1° and repeat Steps 7 and 8, meanwhile displaying T5 and MA.
Step 9 - If Step 8 shows that the output of the fuel limiting amplifier is greater than 240 milliamperes, a check is determined to see if T5 is between 471° and 479°.
Step 10 - A positive answer to the Step 9 check indicates that the pull down test has been successful and the advance light 46 is flashed so that the next test may be undertaken.
Step 11 - If the check of Step 9 shows that T5 is not within the desired range of 471° to 479°, the fuel limiting amplifier output MA is flashed.
Step 12 - The test initiates signal lamp 48 is flashed.
Step 13 - On depressing of the initiate signal, T5 is set to 475°, the T5 pull down switch is closed, and the values of T5 and MA are displayed.
Step 14 - The test initiate signal LED 48 is flashed.
Step 15 - In depressing the initiate test, the system switches over to the fuel limiting amplifier test sequence 01 as previously described in connection with FIG. 4.

It may be seen that, if the T5 pull down test does not go smoothly, a proper signal representing a simulated engine temperature T5 and the actual current output from the fuel limiting amplifier are displayed. In addition, the values are flashed by the LED's to indicate that the tests are not going smoothly and that trouble shooting must be undertaken. Also, Steps 14 and 15 suggest repeating the previous test which is the static fuel limiting amplifier test, in the event the static T5 pull down test of the fuel limiting amplifier does not work. Of course, if the previous test does work and the pull down test does not work, it would be strongly suggested that the pull down switching arrangements are not operative.

The next test is sequence 11 and is the Dynamic Turbine Acceleration/Deceleration Test. This test involves accelerating from less than 75% of trim speed up to above 95% of the theoretical rated speed of the engine; and from trim speed, which is normally greater than the 95% of the theoretical speed of the engine down to 75% of trim speed. The time in seconds for acceleration and deceleration are indicated by the illumination of the LED indicator lights relating to AL for acceleration and DL for deceleration, with the display of the time in seconds required for acceleration or deceleration in display No. 38. The actual steps in the test sequence are set forth in Table No. V.

TABLE V

TURBINE ACCELERATION AND DECELERATION - DYNAMIC

Step 1 - Display sequence 11.
Step 2 - Flash initiate LED 48.
Step 3 - If advance pushbutton switch is depressed, advance to guide vane test.
Step 4 - Depress initiate switch.
Step 5 - Clear and store 75% of the trim RPM setting.

Step 6 - Check speed NH of power section of turbine to determine if it is greater than 0 and flash the speed if it is not rotating, to indicate that the jet engine must be set into operation.

Step 7 - Check to determine if the power section of the turbine speed NH is above 94.9. If yes, deceleration sequence will follow; if no, acceleration sequence will follow.

Step 8 - (Deceleration) Sense one section of frequency decrease of NH.

Step 9 - Set DL to one second and display in display 38 while illuminating the DL indicator light.

Step 10 - Display for 1/10 second.

Step 11 - Add 1/10 second to DL time indication.

Step 12 - Check to see if NH is below 75% of trim speed. If not, return to step 10.

Step 13 - Display DL representing time of deceleration required for the turbine to reach 75% of trim speed.

Step 14 - (Acceleration) NH is checked to determine if it is less than 75% of trim speed, and if it is greater, the speed is flashed to indicate that with the speed between 75% of trim speed and 95% of the turbine speed, The acceleration or deceleration tests cannot be undertaken.

Step 15 - With the engine speed below 75% of trim, following operation of the throttle, one second of frequency increase is sensed.

Step 16 - The AL indicator light is illuminated and display 38 is set to one second.

Step 17 - Delay for 1/10th of a second.

Step 18 - Add 1/10th of a second to the AL display of acceleration time.

Step 19 - Check to determine if the power section speed NH is greater than 95% of theoretical speed of the jet engine, and if not, return to Step 17 for an additional 1/10th of a second delay.

Step 20 - Display the acceleration time required to reach 95% of the theoretical speed, in seconds on display 38; meanwhile continuing to illuminate display indicator AL.

In the foregoing tests, therefore, the time required for standardized acceleration and deceleration of the turbine have been determined.

The next test involves the guide vanes. The guide vanes in a turbine engine of the type under consideration are at the air inlet to the engine. These blades may be adjusted to different angles in order to direct incoming air at most efficient angle. This angle varies from about 35° in the particular engine under consideration under idling conditions down to about 5° when the engine is delivering full-rated horsepower. The position of the guide vanes is determined by the position of a hydraulically-positioned ram actuator member which is responsive to the pressure in the jet engine. In some cases, after prolonged operation of the engine, the linkage between the ram and the guide vanes becomes worn and the guide vanes are no longer accurately positioned in accordance with the position of the LC. The guide vanes may not assume the correct angle for different engine speeds for a variety of other reasons, and the present test involve a checkout both of the guide vanes (GV) and also of the ram position (RP).

The guide van test sequence Nos. 31 and 32 is set forth in table VI below.

TABLE VI

GUIDE VANE TEST - DYNAMIC TEST

Step 1 - Set display sequence number to 31.

Step 2 - Flash initiate light 48 and wait for depression.

Step 3 - Following depressing of the initiate switch, if the guide vane angle is 60° plus or minus 3° flash the guide vane display to indicate that the reading is out of the proper range, probably indicating an open or faulty cable.

Step 4 - Read and store initial values of guide vanes (GV) and ram position (RP), store offset to make initial value equal to 35.0°, store ambient temperature of the test apparatus TA.

Step 4 - If guide vane angle equals 0, flash the GV angle on display 38 indicating a fault.

Step 6 - Display guide vane angle on display 38, with offset; display engine speed NH on display 34, and display temperature T5 on display No. 36.

Step 7 - Engine speed is varied from idle to full-rated power and the displays are examined to see if the guide vane angle changes from about 35° at idle speeds down to about 5° at full bore.

Step 8 - Flash initiate LED 48.

Step 9 - If the advance pushbutton is depressed, shift to the mass air flow test - static.

Step 10 - Upon depressing of the initiate pushbutton switch, the sequence is set to sequence 32.

Step 11 - The RP indicator light is lit and the angle of the vane position is displayed in display 38.

Step 12 - Check to see if RP equals 0, and if so, flash the RP display. In addition, the initiate light is flashed and upon depression of the initiate switch, the RP test is initiated again.

Step 13 - Display vane position RP in display 38, turbine speed NH in display 34 and T5 in display 36.

Step 14 - The jet engine is changed in speed from idle up to full bore and back; meanwhile noting the indicated values of vane position, both at idle and rated power as well as at intermediate points.

Step 15 - Flash initiate and advance lights 46 and 48.

Step 16 - Upon depressing the advance Switch, shift to mass air flow test - static.

As noted above from Table VI, initially the guide vane angle is displayed along with engine speed, and the change is noted from idle up to full bore. Subsequently, similar measurements are made relative to the RAM position angle at various speeds. These angles for the RAM positions should be correlated with the angle for the guide vane, and if there is too much discrepancy or lost motion indicated in the linkage, it should be checked for undue wear and replaced if the wear is beyond accepted tolerances.

The next test to be considered is the Mass Air Flow Test-Static, and this will be set forth on a step-by-step basis in Table VII. By way of background, the fuel limiting amplifier discussed hereinabove in connection with its temperature response, it is also responsive to the speed of the engine. Also, the speed limitation is a collateral function of the input temperature T1 as this indicates the mass of the air passing through the engine and the resultant stress on the turbine blades. Thus, on a hot day, the air expands, and has less mass per unit volume. The fuel limiting amplifier is also provided with a "+10% command" control which permits 10% more speed from the engine. Accordingly, when the 10% switch is activated, the current from the fuel limiting amplifier is reduced by a sufficient amount that the fuel limiting valve associated with the engine opens and permits 10% increased speed from the engine. In the status test, which will be detailed below, the programmable frequency generator 92 (see FIG. 3) provides the simulated engine speed, and when the power output from the fuel limiting amplifier is reduced, the frequency generator is incremented to higher speeds to check the reaction of the fuel limiting amplifier. Against this background, Table VII will now be considered.

TABLE VII
MASS AIR FLOW TEST - STATIC

Step 1 - Set initial conditions; set sequence display to 41.
Step 2 - Flash initiate light 48, wait for depression.
Step 3 - If advance pushbutton is depressed, advance to dynamic mass air flow test.
Step 4 - Depress initiate switch to start static mass air flow test.
Step 5 - Check to determine if speed NL of the gas section of the turbine is greater than 0, and if it is, the speed NL is displayed on display 34 and flashed to indicate improper procedure.
Step 6 - Store the ambient temperature TA.
Step 7 - Set simulated T1 input temperature 15° C. and wait for 15 seconds.
Step 8 - Set simulated speed NL to thumbwheel setting; store NL in location "X" in the random access memory.
Step 9 - Display fuel limiting amplifier output MA on display 38; simulated speed NL on disply 34; and simulated temperature T1 on display 36.
Step 10 - Check to see if the output current from the fuel limiting amplifier is between 235 and 245 milliamperes, and if not, do not proceed further but delay, continuing to display MA, NL, and T1.
Step 11 - If MA is within range set forth in Step 10, blink initate light 48 and delay.
Step 12 - If the advance switch is depressed, the test apparatus is cleared, and test apparatus proceeds to the static double datum test.
Step 13 - Activate the "+10% command" serving to reduce the current output from the fuel limiting amplifier.
Step 14 - Increment simulated speed NL.
Step 15 - Wait 1/10th second.
Step 16 - Display speed NL, temperature T1, and fuel limiting amplifier output current MA.
Step 17 - Check to see if fuel amplifier output is between 235 and 245 milliamperes and if not, return to the speed incrementing step No. 14.
Step 18 - Check to see if the speed has increased by 10%, or that NL/X equals 1.10 ± 0.01.
Step 19 - If the speed is not within this range, flash the display showing the speed and the initiate signal and delay, indicating a fault in the operation.
Step 20 - If speed is within limits of step 18, set sequence to 42 and flash initiate light 48.
Step 21 - Depress initiate pushbutton switch 44.
Step 22 - Decrement NL.
Step 23 - Delay 1/10th second.
Step 24 - Display NL, T1, MA from fuel limiting amplifier.
Step 25 - Check to determine if the current from the fuel limiting amplifier is between 235 and 245 milliamperes, and if not, return to decrement step 22.
Step 26 - Check to see if speed indication NL is within 1% of initial value prior to incrementing, and if not, flash diplay 34 showing NL.
Step 27 - If the simulated speed NL is within limits of step 26, blink advance light 46 and delay.

The next test is the Mass Air Flow Dynamic Test, and surprisingly, as shown in table XIII, it is significantly simpler than the Static Mass Air Test shown in Table No. VII.

TABLE XIII
MASS AIR FLOW TEST DYNAMIC

Step 1 - Display sequence No. 43 and initialize.
Step 2 - Store ambient temperature TA.
Step 3 - Display temperature T1, speed NL, and fuel limiting amplifier output current MA.
Step 4 - Flash initiate light 48.
Step 5 - If advance pushbutton switch is depressed, proceed to static double datum.
Step 6 - If initiate switch is depressed, proceed with dynamic mass air flow test.
Step 7 - Check to determine if engine speed NL is greater than 0. If not, flash NL and return to Step 2.
Step 8 - If NL is greater than 0, the engine is on. Store engine speed NL in location X in random access memory, and activate the −10% contacts, incresing the FLA current output for a predetermined speed NL.
Step 9 - Display temperature T1, engine speed NL, and fuel limiting amplifier current output MA for 10 seconds.
Step 10 - Check to determine if the speed has dropped by 10% ± 1% from Step 9 (X/NL = 1.11 ± 0.01).
Step 11 - If the new speed is not within range, flash speed to indicate a fault, then flash the initiate lamp to either repeat cycle or proceed to other tests.
Step 12 - If new speed is within range of Step 10, flash advance light 46 and upon depression, open or reset the −10% fuel limiting amplifier controls to normal.

It may be noted in passing that the fuel limiting amplifier is provided with one temperature set point and two speed set points. With regard to the temperature set point, this was employed in the T5 Pull Down Test described hereinabove. The fuel limiting amplifier is provided with a +10% speed and a −10% speed adjustment so that the set point for the fuel limiting amplifier output current may be shifted to a 10% higher speed or to a 10% lower speed under the control of the pilot. In the static mass air flow test of Table VII, the +10% command was employed; whereas in the dynamic test of Table XIII, the −10% control was employed and checked out.

The next two tests to be considered are the so-called Double Datum Tests, both Static and Dynamic. The Double Datum Tests relate to a special switch included in the fuel limiting amplifier which is activated as the airplane takes off. More specifically, when the aircraft releases the weight on the landing gear, a switch is actuated which permits a temporary substantial increase in power to the turbine to carry the aircraft through the critical minute or two after the aircraft first becomes airborne. This increase in power to the turbine permitted by the actuation of the double datum switch differs from the permanent shifting of the set point which we have noted above in connection with the T5 pulldown test, and the +10% and −10% switches employed in the static and dynamic mass air flow tests. More specifically, the double datum switch which is actuated on take-off permits an increase in the T5 temperature of at least 15° and not more than 23°, and brings conditions back to normal within approximately 120 seconds, so that the engine is not damaged. With that background, the sequence steps for the Static and Dynamic Double Datum Tests will now be considered.

TABLE IX
STATIC DOUBLE DATUM TEST

Step 1 - Display sequence 51 - set initial conditions.
Step 2 - Flash initiate LED light 48, wait for depression.
Step 3 - If advance pushbutton switch is depressed, go to dynamic double datum test.
Step 4 - check to determine if true NL is greater than 0, and if affirmative, flash NL display on display 34 indicating faulty procedure.
Step 5 - Store the ambient temperature TA.
Step 6 - Set simulated temperature T5 to 575°, delay for 15 seconds.
Step 7 - Store output current in milliamperes from the fuel limiting amplifier in storage location X in the random access memory.
Step 8 - Activate the double datum switch.
Step 9 - Delay for 1/10th second.
Step 10 - Increment T5; read T5 and fuel limiting amplifier output current MA.
Step 11 - Check to determine if the fuel limiting amplifier output current is greater than the value stored in location X in the random access memory in Step 7 prior to activation of DD switch; if it is not greater, store the new value of MA in the random access memory and repeat Steps 9, 10, and 11.
Step 12 - WHen the check of Step 11 indicates that the output from the fuel limiting amplifier has increased (so that fuel flow is being cut back) in the last ten second interval, display the total elapsed time since activation of the DD switch.
Step 13 - Determine if the output current from the fuel limiting amplifier is equal to or greater than 250 milliamperes.
Step 14 - If check indicates that MA is not equal to or greater than 250 milliamperes, update T5 and MA value readings and continue until output current from fuel limiting amplifier exceeds to 250 milliamperes.
Step 15 - At the time the fuel limiting amplifier output exceeds 250 milliamperes, store the elapsed time (normally in the order of 15 seconds).
Step 16 - Check to determine if the elapsed time is equal to or greater than 120 seconds.
Step 17 - If 120 seconds have not yet elapsed, decrement T5 by 0.16 degrees each second and repeat.
Step 18 - Following elapse of 120 seconds, display output current in milliamperes, T5, and new elapsed time.
Step 19 - Reset the double datum switch.
Step 20 - Flash advance LED light 46 and await actuation of switch.

In the foregoing tests it may be noted that, along with the rise in T5 temperature by from 15° to 23°, it is expected that the output from the fuel limiting amplifier will initially drop substantially to permit the flow of additional fuel to the engine, and then the fuel limiting amplifier current will continue to increase past its normal initial value which would be in the order of 240 milliamperes up to a maximum of approximately 300 milliamperes at approximately the time when the temperature T5 comes back to its normal level.

The Dynamic Double Datum Test will now be considered.

TABLE X
DYNAMIC DOUBLE DATUM TEST

Step 1 - Display sequence 52 - set initial conditions.
Step 2 - Flash initiate LED light 48, wait for actuation of pushbutton.
Step 3 - Store the ambient temperature TA.
Step 4 - Check to see if the true engine speed NL is greater than 0, and if the engine is not rotating, flash the NL display indicating improper conditions for dynamic test.
Step 5 - Store temperature T5 in storage position X and storage position Y in the random access memory; activate the double datum switch.
Step 6 - Display fuel limiting amplifier current in milliamperes and temperature T5 for 15 seconds.
Step 7 - Check to determine if new T5 temperature minus prior temperature stored in the X location of the random access memory (T5-X) is equal to a difference of between 15° and 23°; if not, flash temperature T5 indicating departure from proper opeating conditions.
Step 8 - If increase in temperature is in the proper range, delay for 15 seconds.
Step 9 - Check to determine if new T5 is equal to or less than value stored in X location in random access memory.
Step 10 - If T5 is not less than X, store the new T5 value in the X location in the random access memory and display T5 and elapsed time DD.
Step 11 - Delay and repeat check set forth in Step No. 9, repeating Steps 9, 10, and 11 until T5 shows a reduction in value, as indicated by T5 being greater than the prior value of T5 stored in the X location in the RAM.
Step 12 - Stop the timing cycle.
Step 13 - Check to see if T5 is equal to the value of T5 stored in the Y location in the RAM ± 6°.
Step 14 - If temperature has not returned to within 6° of normal, display T5 and repeat step 13 after delay.
Step 15 - Once T5 has returned to within 6° of the original temperature Y, display elapsed time as DD on display 34 and the temperature T5.
Step 16 - Flash advance light 46 and delay.

The foregong dynamic double datum test is substantially self-explanatory with the initial critical test being a determination of when the temperature T5 starts to drop, and the second critical test being the time within which the temperature T5 returns to within 6° of the normal starting temperature which has been stored in the memory of the test apparatus.

The final test series which will be set forth in Table XI below is essentially for diagnostic purposes and involves successive depressing of the advance pushbutton to shift from one test to the next.

TABLE XI
ENGINE TEST RUN - DYNAMIC TEST

Step 1 - Store TA, the ambient temperature.
Step 2 - Depress advance switch to display sequence 91.
Step 3 - Depress initiate switch and display temperature T5, speed NL, and fuel limiting amplifier current output MA.

Step 4 - Depress advance switch to display sequence 92.
Step 5 - Depress initiate switch to display T5, speed NH of the power section and engine pressure reading PG.
Step 6 - Depress advance switch to display sequence 93.
Step 7 - Display T5, NH, and pressure following the compressor and at the inlet to the combustion chamber P3.
Step 8 - Depress advance switch to display sequence 94.
Step 9 - Depress initiate switch to display T5, the outside air temperature, OAT, and engine turbine oil pressure P5.
Step 10 - Depress advance button to display sequence 95.
Step 11 - Depress initiate button to display temperature T1, the inlet air temperature, speed NL, and MA.
Step 12 - Depress advance button and display sequence 96.
Step 13 - Depress initiate button and display in the data displays, temperature T5, speed NH, and current MA.
Step 14 - Depress advance switch and display sequence 97.
Step 15 - Display T1, NH, MA in the data displays.
Step 16 - Depress advance switch and display sequence 98.
Step 17 - Display temperature T3, speed NL, and current MA.
Step 18 - Depress advance switch and display sequence 99.
Step 19 - Depress initiate switch and display T3, NH and MA.
Step 20 - Flash advance LED light 46 and wait.

Table XI as set forth above completes the description of sequences of operation of the test set of the present apparatus. The tables I through XI are essentially equivalent to the sequence flow chart of FIG. 4. From either the sequence flow chart of FIG. 4, or from the sequence Tables I through XI, in accordance with well established practices, the read only memory 66 of FIG. 3 may be configured and preset to provide the functions described hereinabove.

In the present description a number of specific inputs and outputs to and from the test apparatus have been described. With reference to the block circuit diagram of FIG. 3, the inputs and outputs are generally indicated at the lower left of this figure. The speed inputs and outputs are generally referenced by the letter "N", and the switching functions, such as the +10%, −10%, and double datum switching functions are indicated by the bases designated "Discretes" in FIG. 3. It is understood that other inputs and outputs may be included as desired or required to implement particular switching functions.

For completeness, it is noted that the technology employed in the apparatus of FIG. 3 is built around the Intel technology. For example, the CPU 64 of FIG. 3 is Intel Part No. 4004. Full descriptive literature is available from Intel Corporation Microcomputer Systems Group, 3065 Bowers Avenue, Santa Clara, California 95051. Literature available from Intel which is particularly pertinent to the present system include technical material on the single chip four bit P-channel microprocessor 4004, and the literature entitled "MCS-40 Microcomputer System", information on the Type 4201 Clock Generator, corresponding to part 74 in FIG. 3, the MCS-40 User's Manual, 3rd Edition, and the MCS-48 Assembly Language Manual. This and other literature from Intel available from the address set forth above, will readily permit those skilled in the art to implement the system as described herein in connection with FIGS. 2, 3 and 4 of the drawings and Tables I through XI, which are included in the present specification.

The complete program, prepared in accordance with the Intel literature as identified above, occupies approximately 40 to 45 pages of single spaced typewritten pages, with one four digit hexa-decimal number on each line. By way of specific example, in Table XII set forth below, a brief extract of a portion of the detailed program for the Static Double Datum Test is set forth.

TABLE XII

STATIC DOUBLE DATUM TEST

| Location | Command | | | |
|---|---|---|---|---|
| 0400 | | | ORG 400H | |
| 0400 | 5629 | | JMS FLSH1 | |
| 0402 | 4406 | | JUN SDD + 2 | |
| 0404 | 51EF | SDD: | JMS CLRAM | |
| 0406 | 2060 | | FIM 0 , 60H | |
| 0408 | 57FO | | JMS INIT | |
| 040A | D1 | | LDM 1 | Set sequence to 51 |
| 040B | 51A2 | | JMS SESEQ | |
| 040D | 21 | | SRC 0 | |
| 040E | D1 | | LDM 1 | |
| 040F | E0 | | WRM | |
| 0410 | 51C5 | SDDO: | JMS SBINT | |
| 0412 | 14AB | | JZ MAFTL | Jump if advance pressed |
| 0414 | 501F | | JMS RDNL | |
| 0416 | 5625 | | JMS FLSH2 | |
| 0418 | 5040 | | JMS NL96 | |
| 041A | 1406 | | JZ SDD + 2 | Jump if engine running |
| 041C | 54DA | | JMS CLRO1 | |
| 041E | 5225 | | JMS RDTA | Read Ambient Temperature |
| 0420 | D7 | | LDM 7 | |
| 0421 | 55DC | | JMS INIT1 + 1 | Ramp T5 to 575 |
| 0423 | 54AD | SETT5: | JMS INCT | |
| 0425 | 1C00 | | JNZ SDD − 4 | Jump if overflow |
| 0427 | 57C8 | | JMS DISPL | |
| 0429 | 5219 | | JMS RDT5 | |
| 042B | 51B8 | | JMS SBAD + 5 | |
| 042D | 2057 | | FIM 0,57H | |
| 042F | 5790 | | JMS COMP5 | |
| 0431 | 1223 | | JC SETT5 | |
| 0433 | 5600 | SETMA: | JMS SEC10 | Set MA to 300 |
| 0435 | 5600 | | JMS SEC10 | Wait 20 seconds |

It is noted that the foregoing Table XII is only a portion of the Static Double Datum Test. However, persons skilled in the art could readily complete the Static Double Datum Test detailed program, and could readily implement the other tests described in this application using the same Intel literature and the same type of program steps.

In closing, it is to be understood that the system as disclosed in FIGS. 1 through 4 and Tables I through XI could be implemented through the use of semiconductor logic and data processing components and subsystems available from manufacturers other than Intel. Further, other logical system organizations and sequence steps differing from those shown in the present specification, but accomplishing substantially the same functions, could be employed instead of the precise logical circuits and subsystems described herein. Accordingly, the present invention is to be construed in accordance with the appended claims.

What is claimed is:

1. An apparatus for the multifunctional testing of a jet engine including the fuel limiting amplifier associated with the engine, comprising:
   means for connecting the test apparatus to the jet engine and to its associated fuel limiting amplifier;
   variable means for displaying a test designation to indicate and identify the particular one of the successive tests being conducted by the testing apparatus at a particular time;
   advance switch means for manually advancing the test sequence to the desired test sequence;
   initiate switch means for initiating the test sequence indicated by the sequence display means;
   trim R.P.M. entry switch means for entering data representing the trim R.P.M. of the particular jet engine being tested;
   a plurality of additional variable display means for displaying data resulting from tests performed by said test apparatus; and
   means for successively testing various jet engine parameters and displaying in the sequence display means an indication of the tests being performed and for presenting the data resulting from said tests in said additional variable display means.

2. A multifunctional test apparatus as defined in claim 1, further comprising:
   advance indicating light means associated with the advance switch means, for indicating that a prior test sequence has been completed; and
   initiate light indicating means associated with the initiate switch means for indicating that the sequence has been advanced and that the next test sequence may be started.

3. A multifunctional test apparatus as defined in claim 1 further comprising:
   a plurality of indicating lights associated with each of said additional display means for identifying the data being displayed.

4. A multifunctional test apparatus as defined in claim 3 wherein duplicate indicating lights are provided to represent each type of data and means are provided for illuminating said duplicate lights together to minimize the effect of failure of an indicating light.

5. A multifunctional test apparatus as defined in claim 1 further comprising:
   means for flashing one of said displays in the event the testing is not proceeding in accordance with a predetermined schedule.

6. A multifunctional test apparatus as defined in claim 1 further comprising:
   means for executing an initial self-test sequence to check the operation of the test apparatus and displaying acceptability.

7. A multifunctional test apparatus as defined in claim 1 further comprising:
   means for supplying jet engine temperature signals to said test apparatus.

8. A multifunctional test apparatus as defined in claim 1 further comprising:
   means for supplying a simulation of jet engine speed signals to said fuel limiting amplifier.

9. A multifunctional test apparatus as defined in claim 1 further comprising means for supplying guide vane angle information from said test apparatus engine to the test apparatus.

10. A multifunctional test apparatus as defined in claim 1 further comprising:
    means for simulating jet engine temperature signals.

11. A multifunctional test apparatus as defined in claim 1 further comprising:
    means for testing the fuel limiting amplifier.

12. A multifunctional test apparatus as defined in claim 1 further comprising:
    means for dynamically testing the acceleration and deceleration of the jet engine.

13. A multifunctional test apparatus as defined in claim 1 further comprising:
    means for dynamically testing and displaying guide vane angle and engine speed at varying engine speeds.

14. A multifunctional test apparatus as defined in claim 1 further comprising means for testing mass air flow under various temperature conditions.

15. A multifunctional test apparatus as defined in claim 1 further comprising:
    means for performing double datum test to determine engine system time constants in restoring normal operating conditions following application of burst of power for take-off.

16. A multifunctional test apparatus as defined in claim 1 further comprising:
    means within the test apparatus for generating a plurality of signals simulating jet engine operating signals; and
    means for conducting static tests of the jet engine system using said simulated operating signals, and subsequently conducting dynamic tests.

17. A multifunctional test apparatus as defined in claim 16 further comprising:
    means for checking the speed of said jet engine prior to embarking on a static or dynamic test; and
    means for stopping the test if the engine speed is inconsistent with the test to be performed.

18. A multifunctional test apparatus as defined in claim 1 wherein three data displays are provided, and further including:
    means for selectively displaying engine speed or elapsed time for the double datum test in one of said data displays and for indicating which parameter is being displayed;
    means for selectively displaying different engine temperatures in a second one of said displays, and for indicating the temperature which is being displayed; and
    means for selectively displaying the output current of the fuel limiting amplifier, guide vane position, or various engine pressures in said third data display, and for indicating which of said parameters is being displayed.

19. A multifunctional test apparatus as defined in claim 1 further comprising:
means for establishing limits for a number of said tests; and
means for stopping said tests and flashing a visual indication of fault at such time as any of said established limits are passed.

20. An apparatus for the multifunctional testing of an engine, comprising:
means for connecting the test apparatus to the engine;
variable means for displaying a sequence number representing the successive tests undertaken by the testing apparatus;
advance switch means for manually advancing the test sequence to the desired test sequence;
initiate switch means for initiating the test sequence indicated by the sequence display means;
a plurality of additional variable display means for displaying data resulting from tests performed by said test apparatus;
means for successively testing various engine parameters and displaying in the sequence display means an indication of the tests being performed and for presenting the data results from said tests in said additional variable display means;
means for establishing limits for a number of said tests; and
means for stopping said tests and providing a special bold visual indication of fault at such time as any of said established limits are passed.

21. A multifunctional test apparatus as defined in claim 20 further comprising:
a plurality of indicating lights, associated with each of said additional display means for identifying the data being displayed, and with said advance and initiate switches, to indicate that advance or test initiate action, respectively, is appropriate.

22. An apparatus for the automatic multifunctional testing of a jet engine including the fuel limiting amplifier associated with the engine, comprising:
means for connecting the test apparatus to the jet engine and to its associated fuel limiting amplifier;
variable means for displaying a sequence designation to indicate and identify the particular one of the successive tests being conduted by the testing apparatus at a particular time;
a plurality of additional variable display means for displaying data resulting from tests performed by said test apparatus;
means for successively testing various jet engine parameters and displaying in the sequence display means an indication of the tests being performed and for presenting the data resulting from said tests in said additional variable display means;
means for establishing a plurality of predetermined operating limits for test results for successive tests and for storing these limits in said test apparatus;
means for providing a special indication when the test results do not fall within said predetermined test limits; and
means for successively shifting from one test to the next while concurrently changing the sequence designation indicating the test being performed.

23. A multifunctional test apparatus as defined in claim 22 wherein three data displays are provided, and further including:
means for selectively displaying engine speed or elapsed time for the double datum test in one of said data displays and for indicating which parameter is being displayed;
means for selectively displaying different engine temperatures in a second one of said displays, and for indicating the temperature which is being displayed; and
means for selectively displaying the output current of the fuel limiting amplifier, guide vane position, or various engine pressures in said third data display, and for indicating which of said parameters is being displayed.

24. A multifunctional test apparatus as defined in claim 22 further comprising:
means for simulating the speed of the engine and for using this simulated speed during static tests.

25. A multifunctional test apparatus as defined in claim 22 further comprising:
means for simulating at least one operating temperature of the engine and for utilizing this simulated temperature during static tests.

26. A multifunctional test apparatus as defined in claim 22 wherein said apparatus includes means for successively and automatically performing tests and displaying test results for (1) self-test off the test equipment (2) acceleration or deceleration (3) mass air flow, and the "double datum" testing of engine response.

27. A multifunctional test apparatus as defined in claim 26 wherein means are included for initially performing both said mass air flow and said double datum tests statically, and then dynamically.

28. A multifunctional test apparatus as defined in claim 22 wherein said means for providing a special indication to indicate out-of-limits conditions includes means for flashing at least one pertinent display and for stopping the test sequence.

* * * * *